Aug. 14, 1951     L. E. JONES     2,564,160
TRANSMISSION

Filed Dec. 1, 1948     3 Sheets-Sheet 1

INVENTOR.
LLOYD E. JONES
BY John W. Michael
ATTORNEY

Aug. 14, 1951     L. E. JONES     2,564,160
TRANSMISSION
Filed Dec. 1, 1948     3 Sheets-Sheet 2
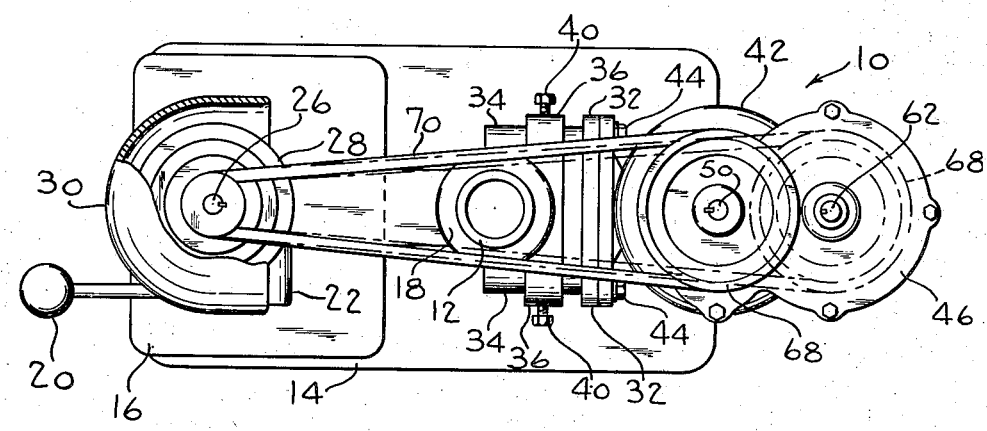
FIG. 2
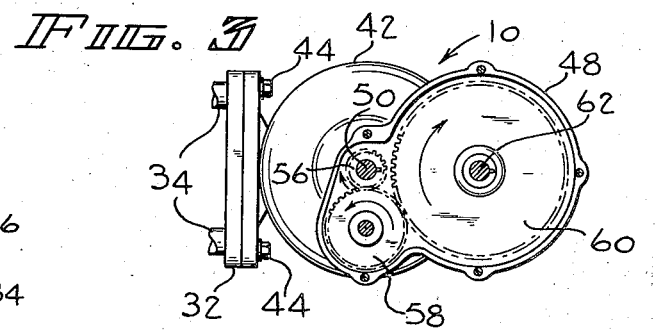
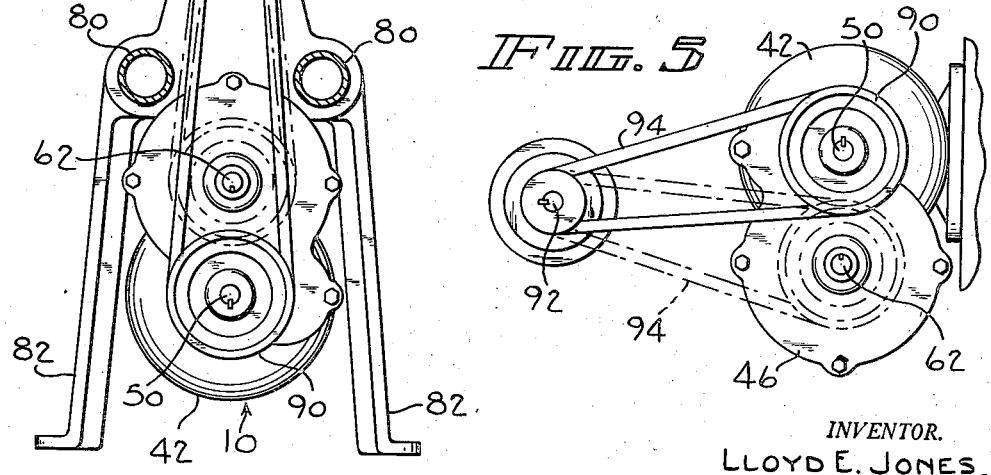
FIG. 3
FIG. 4
FIG. 5
INVENTOR.
LLOYD E. JONES
BY John W. Michael
ATTORNEY Aug. 14, 1951           L. E. JONES           2,564,160

TRANSMISSION

Filed Dec. 1, 1948           3 Sheets-Sheet 3

INVENTOR.
LLOYD E. JONES
BY John W. Michael
ATTORNEY

Patented Aug. 14, 1951

2,564,160

UNITED STATES PATENT OFFICE 2,564,160

TRANSMISSION

Lloyd E. Jones, Milwaukee, Wis., assignor to Graham Transmissions, Inc., Milwaukee, Wis., a corporation of Delaware Application December 1, 1948, Serial No. 62,961

12 Claims. (Cl. 74—217)

This invention relates to a transmission making a wide speed range available to a driven shaft or spindle.

This application is a continuation in part of my co-pending application Serial No. 47,219, filed September 1, 1948, and now abandoned.

Machine tools such as lathes are customarily equipped with a drive making a wide speed range avaliable on the driven shaft or spindle. The driving mechanism on these tools is not completely satisfactory, particularly in the case of the smaller or bench type lathes which are generally provided with a step cone pulley drive through a countershaft from the constant speed motor. Such a drive requires two belts in series with loss of power, tensioning, and space problems in addition to being unattractive and making the use of a belt guard impractical.

On the other hand, machines such as drill presses, shapers, saws, combination woodworking tools, milling machines, conveyors, and mixers are usually provided with a speed range satisfactory for either general or special work but not for both. A drill press, for example, may be equipped for a given speed range which is satisfactory for the general run of work (which requires a high speed range) but is unsatisfactory for such operations as spot-facing, reaming, counterboring, and drilling hardened parts (requiring a low speed range). In order to obtain full use of these machines it has been necessary to resort to one of several methods, none of which is completely satisfactory.

A constant power multiple speed motor suggests itself, but the high cost of the motor and its control effectively precludes its use. A countershaft with the consequent loss of power, belt tensioning, and space problems mentioned above seriously limits the particular tool in many instances. Thus, when the countershaft is mounted at the head of the column in a drill press the belts do not clear the column, thus limiting the spindle travel and precluding use on drills having production tables.

It will be apparent that while there is a great need for a wide speed range on many machines, there has not been a completely satisfactory answer to the problem of providing such a speed range at low cost and without limiting the machine.

An object of this invention, therefore, is to provide a simple, inexpensive device for obtaining a wide speed range on machines of the type described without interfering with the normal full use of such machines.

Another object is to provide for a driven shaft a drive which may readily be converted from one speed range to another.

A further object is to provide a convertible drive for machines of the type described which is not an accessory but which is on the machine at all times.

Still another object is to provide a convertible drive which may be readily mounted on machines of the type described with no change in the machine design.

A further object is to provide a drill press having a wide speed range available at all times without limiting the use of the press.

Another object is to provide a lathe having a simple compact drive permitting predetermination of and obtaining the most desirable spindle or headstock speeds without regard to maintenance of a fixed center distance between the driving shaft and the driven spindle.

Other objects and advantages will be pointed out in, or be apparent from, the specification and claims, as will obvious modifications of the single embodiment shown in different installations in the drawings, in which:

Fig. 2 is a top view of Fig. 1 taken along line 2—2;

Fig. 3 is a view of the reduction gearing as viewed from section line 3—3 in Fig. 1;

Fig. 4 is an end view of a convertible gearmotor driving the spindle of a combination woodworking tool;

Fig. 5 is an end view showing another mounting arrangement for the convertible gearmotor;

Figure 1:
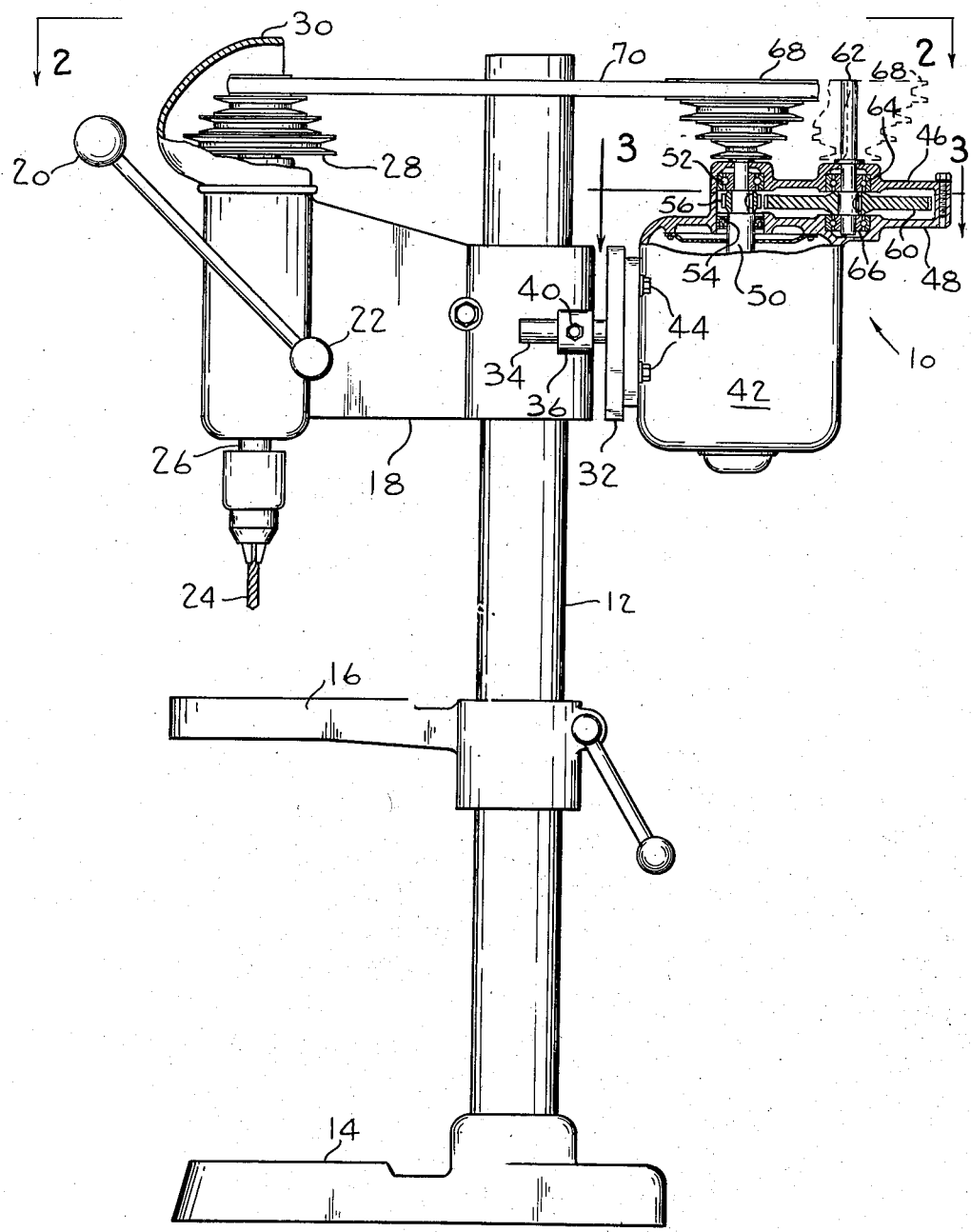
Fig. 1 shows a convertible gearmotor driving the spindle of a drill press.

Figs. 1 through 3 show my gearmotor 10 mounted on a conventional bench type drill press having vertical column 12 mounted in base 14 with the usual table 16 and head 18 adjustably mounted thereon. Handle 20 is moved down about shaft 22 to feed drill 24 into the work on the table. The drill is mounted on and rotatable with spindle 26 having a multiple step pulley 28 keyed to its upper end within guard 30. Mounting bracket 32 has a pair of horizontal parallel pins 34, 34 slidably fitting in supporting ears 36, 36 on either side of the rear of head 18 to permit adjustment of the distance between shaft centers. Lock nuts 40, 40 hold the bracket pins in adjusted position. The bracket is provided with parallel vertical slots (not shown) spaced to receive the standard electric motor mounting nuts and of such length to permit of vertical motor movement.

The structure described to this point is conventional. Instead of mounting the usual electric motor on the bracket and limiting the drill press operation as pointed out above, the drill press illustrated is provided with a gearmotor 10 including electric motor 42 mounted in a vertical position on bracket 32 by nuts 44, 44 and having a gear box mounted on its upper end and comprising cover plate 46 bolted to bottom casting 48 carried by motor 42. The motor or high speed shaft 50 is journalled in bearing 52 in the gear box and extends out from the gear box. Due to the vertical mounting of the gearmotor a shaft seal 54 is provided, and the gear box is preferably filled with grease rather than oil. Gear 56 is keyed on high speed shaft 50 between bearing 52 and shaft seal 54 and engages idler gear 58 which meshes with low speed gear 60 keyed to shaft 62. The low speed shaft, journalled in bearings 64, 66, is brought out of the gear box the same distance as the high speed shaft.

While conventional design practice would dictate that the high speed shaft diameter be smaller than the low speed shaft, the instant high speed shaft 50 is oversized in that it is the same diameter as shaft 62. Shafts 50, 62, extending the same distance from the gear box, are spaced to permit mounting four-step pulley 68 on either shaft without interference from the other shaft. Since the low speed shaft is driven through idler gear 58, pulley 68 rotates in the same direction on either shaft. This eliminates the necessity for a reversible motor and reversing switch which would add to the cost of the drive.

It will be apparent, therefore, that when pulley 68 is mounted on the high speed shaft 50 (as shown in full lines in Figs. 1 and 2) the V-belt 70 straddles and clears column 12 in driving the spindle pulley 28. The high speed operation of the drill press is unaffected and not limited by the use of the gearmotor. Merely mounting pulley 68 on low speed shaft 62 (as in dotted lines in Figs. 1 and 2) and connecting to spindle pulley 28 with a longer V-belt makes a low speed range available. It is to be noted that shaft 62 is coplanar with shaft 50 and spindle 26, thus permitting the V-belt to clear column 12. The increased belt tension necessary at low speed does not load high speed bearing 52 or shaft 50 but only loads the low speed shaft bearings 64, 66. The reduction in the gearmotor shown is 5:1, and the drive provides a low speed range.

Thus, while a conventional drill press having a multiple step pulley driven by an 1800 R. P. M. motor may have speeds from 600 to 5400 R. P. M. giving a speed range of 9:1 which is not adequate for all work, the same drill press, when equipped with my transmission driven by a 3600 R. P. M. motor, may have a speed range from 240 to 10,800 (45:1). From this it will be apparent that the speed range is multiplied by the reduction ratio of 5 and that the high speed is multiplied by 2 while the low speed is reduced by 2½. Of course, the number of speed steps in the increased range is doubled. The tremendous advantage of such a wide total speed range with such a simple conversion from one range to the other will be readily appreciated. Since the V.-belt clears column 12 in either range, the drill press operation is not limited in any respect, and the transmission may be mounted on any standard press to make it useful for all types of jobs.

Similarly, a wide speed range may be obtained on machines such as the combination woodworking tool shown in Fig. 4. This tool has parallel tubular ways 80, 80 supported by legs 82, 82 adapted to be bolted to a bench. When the ways are horizontal the tool may be used as a saw, disc sander, lathe, or horizontal drill press, and the ways may be swung into a vertical position to use the machine as a vertical drill press. Headstock 84 carries spindle 86 with a three-step pulley 88 keyed thereon.

Due to space limitations under the ways, gearmotor 10 is mounted with low speed shaft 62 between and in line with high speed shaft 50 and spindle 86. With this arrangement the belt always lies between and clears the tubular ways. The three-step pulley drive shown provides a high speed range when pulley 90 is mounted on shaft 50 (full lines in Fig. 4) and a speed range with the drive from shaft 62 (dotted lines in Fig. 4). Here, as with the drill press, the total speed range is multiplied by 5.

Where space permits, gearmotor 10 may be mounted with both shafts 50, 62 parallel to and equally spaced from the driven shaft 92 to form an isosceles triangle, as shown in Fig. 5. With this arrangement the high speed drive (full lines) may be changed to a low speed drive (dotted lines) by merely taking pulley 90 off shaft 50, keying it to shaft 62, and tensioning the same belt 94. Similarly, the motor may be mounted in slots permitting movement of either shaft to a given location so that the belt always lies in the same space. This would be particularly advantageous where the clearance at the headstock or between ways would not permit moving the belt on an arc as in Fig. 5.

Figure 6:
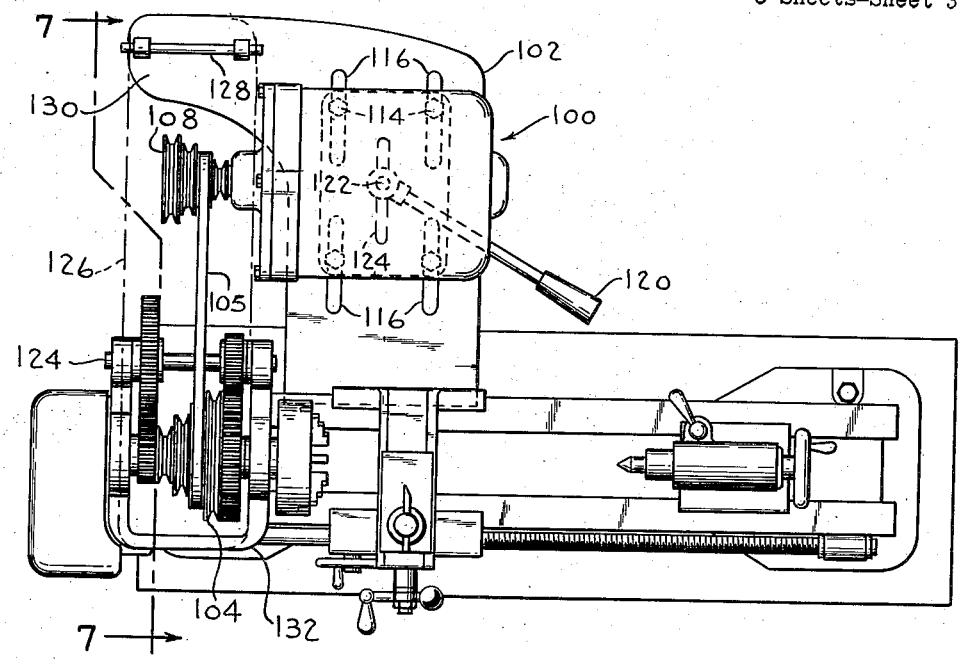
Fig. 6 is a top plan view of a bench type lathe provided with a novel drive incorporating my transmission.
Figure 7:
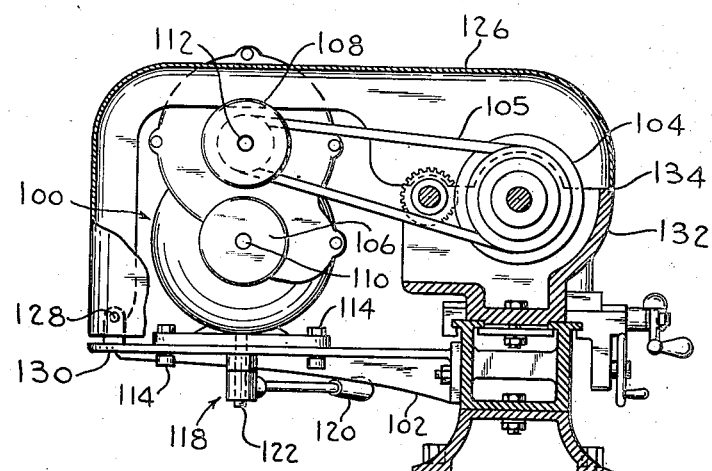
Fig. 7 is a sectional view taken on line 7—7 of Fig. 6.

A similar isosceles triangle arrangement is particularly advantageous when utilized in driving a lathe as shown in Figs. 6 and 7. The gearmotor 100 is mounted on bracket 102 which is secured to the side of the lathe bed to drive pulley 104 through belt 105 at selected speeds from either of pulleys 106, 108, respectively, mounted on the high and low speed shafts 110, 112. Guide pins 114 are mounted in the gearmotor base and extend through cooperating slots 116 in bracket 102 to permit the motor to be moved to or from the lathe headstock to slacken or tension the belt. The gearmotor may be locked with respect to bracket 102 by means of cam device 118 operated by handle 120 and carried on pin 122 depending from the gearmotor base through slot 124 in the mounting bracket.

Being able to thus vary the distance between the drive and the headstock results in permitting the increment between pulley steps to be predetermined to obtain the most useful lathe speeds without regard to maintenance of a fixed distance between spindle and shaft centers. Similarly, the pulleys may be kept on their shafts making it a simple matter to change from one speed range to the other merely by moving handle 120 to release the gearmotor on the mounting bracket for movement toward the headstock, placing the belt on the other pulley, pushing the gearmotor out from the lathe until the belt is properly tensioned, and moving handle 120 back to lock the gearmotor by means of cam device 118. Since the pulleys need not be interchangeable, the shafts 110, 112 may be of different size.

While the gearmotor shafts need not necessarily form an isosceles triangle with the spindle, such an arrangement is preferred since it lends to more compact spacing and permits the belt to clear the back gearing shaft 124 in either position.

Thus the countershaft previously employed for obtaining a wide speed range in bench lathes may be replaced by a more compact unit mounted to permit ready speed change and selection of the most desirable speed steps throughout the range. In addition to eliminating the belts in series necessitated by the countershaft, the present structure permits of use of a belt guard which increases safety while enhancing the appearance of the lathe. Thus belt guard 126 is pivoted on hinge pin 128 mounted on arm 130 of mounting bracket 102. The free end of guard 126 is adapted to seat on the upper edge of lathe casing 132 at 134 to enclose the belts and pulleys. The guard may, of course, be raised or pivoted about pin 128 to gain access to the parts of the drive.

Thus I have provided a transmission which increases the speed range of a driven spindle while delivering full motor power at all speed steps. This device is not an attachment but is completely interchangeable with the usual motor or other drive in the particular machine without limiting the functioning of the machine in any operation. Indeed, when applied to machines such as the drill press and lathe as shown in the drawings it obtains further advantages as pointed out above. It is obvious, of course, that a chain and sprocket drive may be employed in lieu of the belt and pulley drive shown. It will also be evident that further reduction could be used and additional shafts brought out of the gear box to further increase the speed range.

Although but one embodiment of the present invention has been illustrated and described in connection with the various installations shown by way of example, it will be apparent to those skilled in the art that various changes and modifications may be made therein without departing from the spirit of the invention or from the scope of the claims. As used in the claims the term "spindle" also includes a shaft, and the term "pulley" includes a sprocket and other similar devices.

I claim:

1. The combination with a driven spindle of a machine, of a transmission having two shafts permanently connected by gearing including an idler gear so both shafts rotate in the same direction at different speeds, means for driving said transmission, and means adapted for mounting on either of the shafts to selectively drive said machine spindle.

2. The combination with a driven spindle, of an electric motor having a gear box mounted thereon, a pair of equal diameter shafts mounted in the gear box and extending therefrom substantially the same distance, said shafts being permanently geared together through an idler gear, and means selectively mountable on either of the shafts to drive the spindle.

3. The combination with a driven spindle having a pulley mounted thereon, of an electric motor having a gear box mounted thereon, the motor shaft extending from the gear box and having a driving gear mounted thereon within the gear box, a low speed shaft having the same diameter as the high speed shaft, journalled in the gear box and extending from the gear box the same distance as the high speed shaft, a gear mounted on the low speed shaft and driven by the driving gear through an idler gear journalled in the gear box, and another pulley having a maximum radius less than the distance between the shafts and adapted to be mounted on either shaft to drive the spindle pulley through a belt.

4. The combination with a driven machine spindle of, a casing, a gearmotor in the casing and having both the high and low speed shafts brought out of the casing substantially the same distance and being substantially the same diameter, both of the shafts being substantially coplanar with the spindle, and pulley means mountable on either shaft to selectively drive the spindle.

5. The combination with a driven machine spindle of, a casing, a gearmotor in the casing and having both the high and low speed shafts brought out of the casing substantially the same distance and of substantially the same diameter, the low speed shaft being driven through an idler gear in the same direction as the high speed shaft, both of the shafts being parallel to and equidistant from the spindle, and pulley means mountable on either shaft to selectively drive the spindle.

6. The combination with a driven shaft of, an electric motor having a reduction gear casing mounted thereon, a high speed shaft journalled in the casing and extending from the casing, a driving gear mounted on the high speed shaft within the casing, a low speed shaft having substantially the same diameter as the high speed shaft and being journalled in the casing and extending from the casing substantially the same distance as the high speed shaft, a driven gear of greater diameter than said driving gear and mounted on said low speed shaft within the casing, an idler gear journalled in the casing and meshing with both the driving and driven gears so that the driven gear is rotated at reduced speed in the same direction as the driving gear, a pulley having a radius less than the distance between the shafts and being mountable on either the high or low speed shaft to drive the driven shaft through a belt.

7. A drill press having a head mounted on a vertical column, a spindle rotatably mounted in the head, a motor driven transmission having a plurality of shafts coplanar with the spindle and being permanently connected by gearing so the shafts rotate at different speeds, and means engageable with any of the shafts and adapted to selectively drive said machine spindle.

8. A gearmotor in a housing and having both the high and low speed shafts thereof extending from the gearmotor housing to the same extent and having the same diameter, the gearmotor gearing including an idler gear so both shafts rotate in the same direction.

9. The combination with a lathe including a spindle, of a gearmotor having both shafts brought out of the motor casing, said shafts being permanently geared together, a pulley mounted on each shaft, a belt for selectively driving said spindle from either pulley, a mounting for said gearmotor, said gearmotor being movable in said mounting toward and away from said spindle to vary the center distance between the shafts and the spindle.

10. The combination with a lathe including a spindle, of a gearmotor having both shafts brought out of the motor casing, said shafts being permanently geared together, a pulley mounted on each shaft, a belt for selectively driving said spindle from either pulley, a mounting for said gearmotor, said gearmotor being movable in said mounting toward and away from said spindle to vary the center distance between the shafts and the spindle, said shafts being equidistant from the spindle.

11. The combination with a lathe including a spindle, of a gearmotor having two shafts brought out of the motor casing substantially the same distance and substantially the same diameter, said shafts being permanently geared together by means of an idler gear so they rotate in the same direction, mounting means for said gearmotor retaining said shafts parallel to and equidistant from said spindle, pulley means mountable on either shaft, a belt for selectively driving said spindle from either shaft, said gearmotor being movable in said mounting toward and away from said spindle to vary the center distance between the shafts and the spindle.

12. The combination with a machine tool including a spindle, of a casing, a gearmotor in the casing, and having both shafts brought out of the motor casing, said shafts being permanently geared together, a pulley mounted on each shaft, a belt for selectively driving said spindle from either pulley, a mounting for said gearmotor, said gearmotor being movable in said mounting toward and away from said spindle to vary the center distance between the shafts and the spindle.

LLOYD E. JONES.

REFERENCES CITED

The following references are of record in the file of this patent:

UNITED STATES PATENTS

| Number | Name | Date |
|---|---|---|
| 1,411,538 | Sweetland | Apr. 4, 1922 |
| 2,075,240 | Tautz | Mar. 30, 1937 |
| 2,154,745 | Hedgpeth | Apr. 18, 1939 |
| 2,367,267 | Dawson | Jan. 16, 1945 |
| 2,446,645 | Flinchbaugh | Aug. 10, 1948 |
| 2,473,963 | McKelvey | June 21, 1949 |